S. E. HUGHES.
ROAD SCRAPER AND GRADER.
APPLICATION FILED MAR. 14, 1911.
1,019,153.
Patented Mar. 5, 1912.
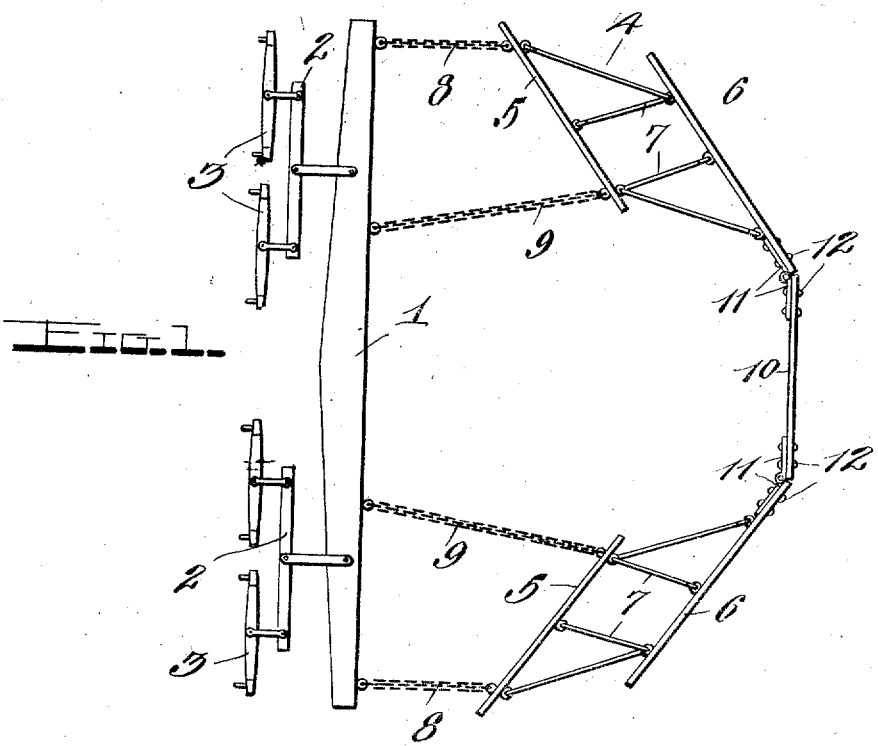
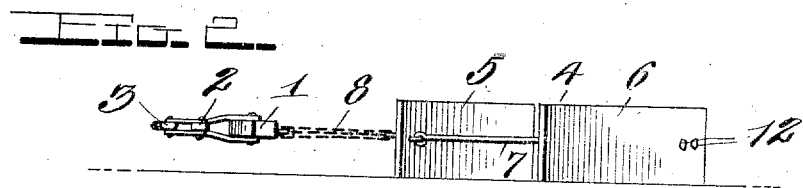
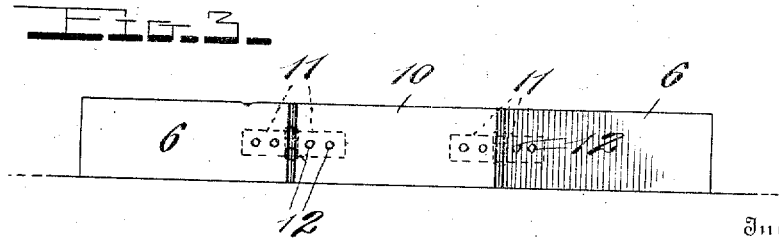
Witnesses
Chas. L. Griesbauer
L. H. Ellis
Inventor
S. E. Hughes,
By Watson E. Coleman
Attorney

UNITED STATES PATENT OFFICE.

SAMUEL E. HUGHES, OF ALEXANDRIA, INDIANA.

ROAD SCRAPER AND GRADER.

1,019,153.  Specification of Letters Patent.  Patented Mar. 5, 1912.

Application filed March 14, 1911. Serial No. 614,405.

*To all whom it may concern:*

Be it known that I, SAMUEL E. HUGHES, a citizen of the United States, residing at Alexandria, in the county of Madison and State of Indiana, have invented certain new and useful Improvements in Road Scrapers and Graders, of which the following is a specification, reference being had to the accompanying drawings.

This invention is an improved road scraper and grader and consists in the construction, combination and arrangement of devices hereinafter described and claimed.

The object of my invention is to provide an improved road scraper and grader which is extremely simple in construction, may be readily manufactured at slight cost and which is adapted for scraping and grading roads and other surfaces and leveling the same in a thoroughly efficient manner.

In the accompanying drawings Figure 1 is a plan of a road scraper and grader constructed in accordance with my invention; Fig. 2 is a side elevation of the same; and Fig. 3 is a rear elevation of the same.

In the embodiment of my invention I provide a draft beam 1 which may be of suitable dimensions and to it, at suitable distances from its ends, are connected double-trees 2, each double-tree being provided with swingle-trees 3. In the rear of the draft beam are obliquely disposed drag wings 4 each of which comprises a front blade 5 and a rear blade 6. The front blades are shorter than the rear blades. The front and rear blades of each drag wing are parallel and the said blades of the respective drag wings are reversely arranged and converge rearwardly. The outer ends of the front blades are in the same longitudinal plane with those of the rear blades, or, in other words, the rear ends of the rear blades extend inwardly from the front blades. The reversely disposed V-shaped braces 7 flexibly connect the front and rear blades of the drag wings and the front blades are connected to the draft beam 1 by chains 8 and 9 which are respectively located near their outer and inner ends, the chains 9 being longer than the chains 8 so as to dispose the blades of the drag wings at an angle with respect to the draft beam 1. The center blade 10 is disposed between the rear ends of the rear blades 6 and is detachably connected thereto by means of suitable link-straps 11 and bolts 12 or other suitable devices. It is to be understood that the blades may be of any suitable construction.

It will be understood that when the scraper and grader is being drawn along a road the rearwardly converging drag wings scrape the road surface and crown the same between the said drag wings and the blade 10 smooths and scrapes the central portion of the road.

The blades and other parts of my improved scraper and grader may be made of any suitable size and proportion, according to the work and other requirements of the case and if desired, as where the device is being used on a narrow road, the central blade 10 may be removed and the inner ends of the rear blades 6 connected directly together.

What I claim is:

The herein described road scraper and grader comprising a transversely arranged central blade, a pair of drag wings, each of which comprises a plurality of obliquely disposed blades arranged one in advance of another, the blades of the respective drag wings being oppositely arranged and the rear blade of each drag wing being directly hinged at its inner end to one end of the central blade, the front blade of each drag wing being shorter than the rear blade thereof, reversely disposed V-shaped braces connecting the front and rear blades of the drag wings and flexibly connected thereto, a draft beam substantially parallel with the central blade and chains connecting the ends of the front blades of the drag wings directly to the draft beam at points near the ends and also spaced from the ends thereof.

In testimony whereof I hereunto affix my signature in the presence of two witnesses.

SAMUEL E. HUGHES.

Witnesses:
  JOHN M. HUGHES,
  GEORGE GOSNELL.